Nov. 25, 1952    W. E. MILLER    2,619,238
APPARATUS FOR HANDLING STACKED CONTAINERS
Filed March 18, 1947    4 Sheets-Sheet 1

INVENTOR.
Walter Earl Miller
BY
his Attorney

Nov. 25, 1952 — W. E. MILLER — 2,619,238
APPARATUS FOR HANDLING STACKED CONTAINERS
Filed March 18, 1947 — 4 Sheets-Sheet 2

INVENTOR.
Walter Earl Miller
By
his Attorney

Nov. 25, 1952 W. E. MILLER 2,619,238
APPARATUS FOR HANDLING STACKED CONTAINERS
Filed March 18, 1947 4 Sheets-Sheet 3
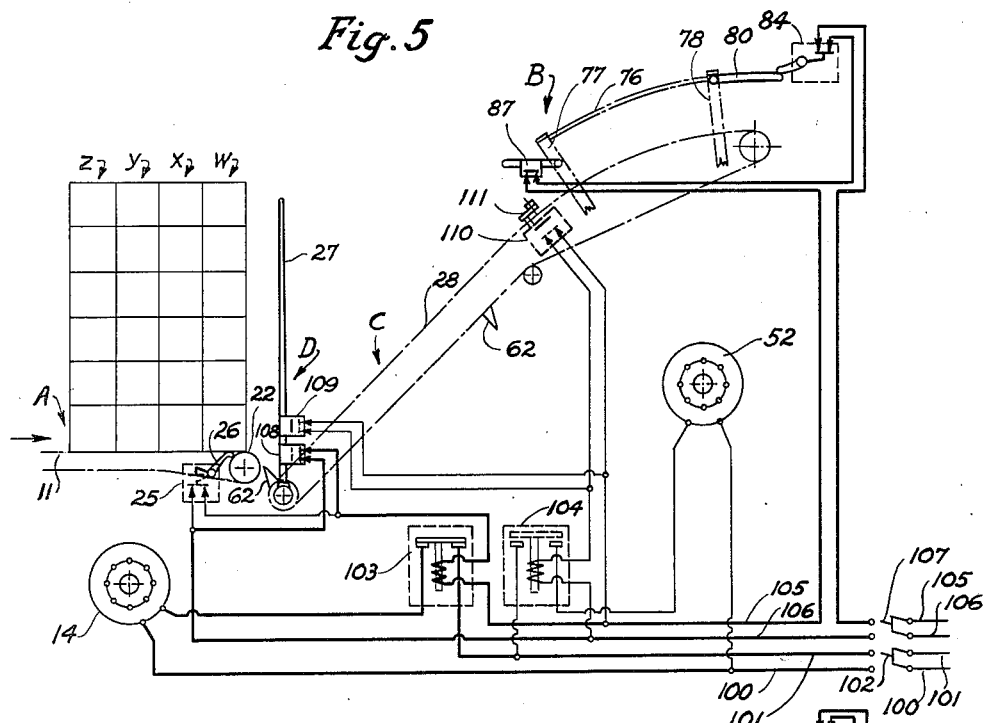
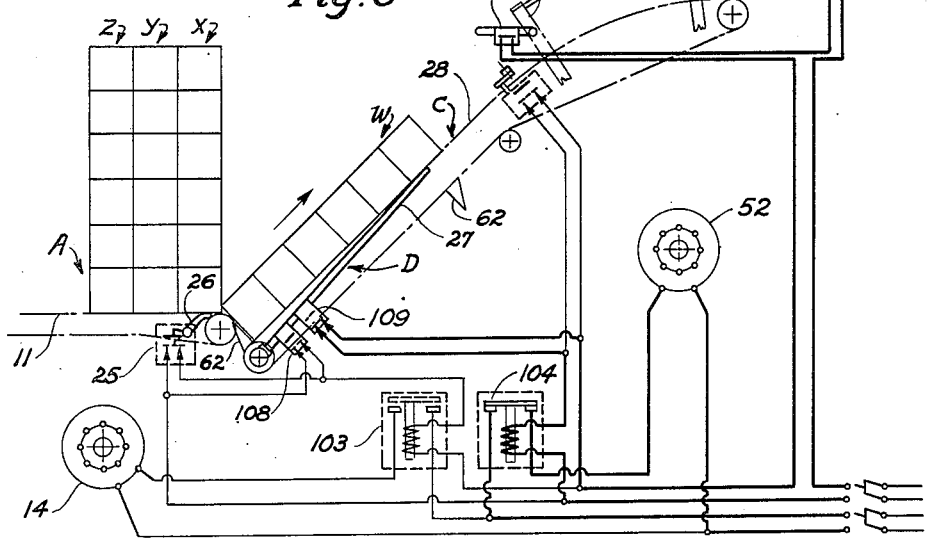
INVENTOR.
Walter Earl Miller
BY
his Attorney Nov. 25, 1952 W. E. MILLER 2,619,238
APPARATUS FOR HANDLING STACKED CONTAINERS
Filed March 18, 1947 4 Sheets-Sheet 4
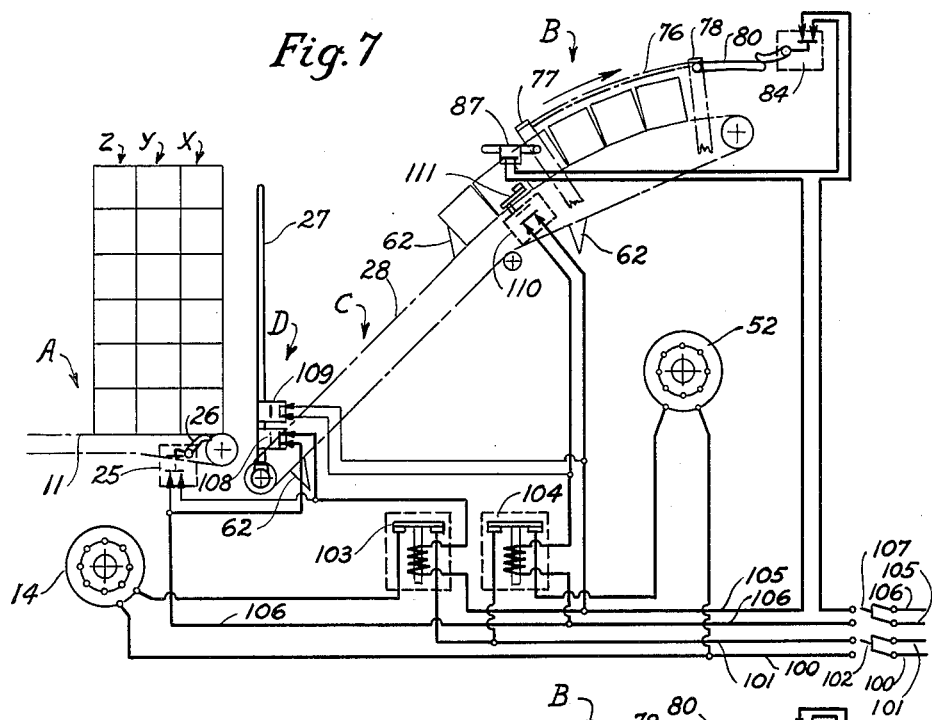
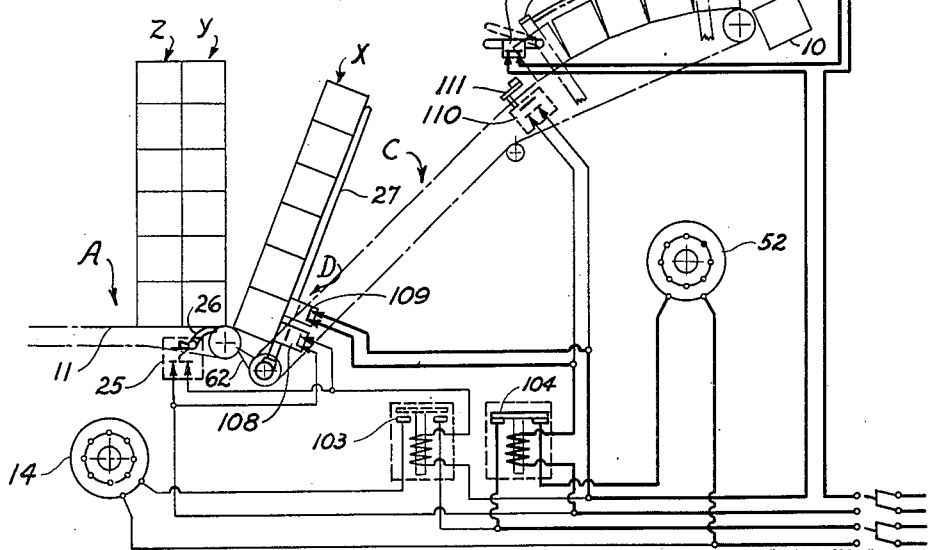
INVENTOR.
Walter Earl Miller
BY
his Attorney Patented Nov. 25, 1952

2,619,238

UNITED STATES PATENT OFFICE 2,619,238

APPARATUS FOR HANDLING STACKED CONTAINERS

Walter Earl Miller, Placentia, Calif., assignor, by mesne assignments, to Brogdex Company, Pomona, Calif., a corporation Application March 18, 1947, Serial No. 735,393

4 Claims. (Cl. 214—1.1)

This invention relates to apparatus for handling stacked containers. More particularly it relates to apparatus for disassembling or "breaking down" a tiered or stacked container-group into its individual containers and dumping said containers at a convenient point for performance of some operation upon said contents.

A primary object of this invention is to provide novel apparatus for automatically co-ordinating a series of operations in properly timed sequence, said series of operations comprising the feeding of stacked containers individually, to a stack disassembling and dumping unit which functions to unstack the grouped containers and dump them.

Apparatus of this type has particularly practical application in the fresh fruit and vegetable processing industry where field boxes, into which the fruit or vegetable is placed when harvested, are delivered to the packing house. They are there generally deposited upon a floor or temporary storage platform in tiers or stacks of as high as six or seven boxes in order to save space. It then becomes necessary to unstack these boxes in order to empty them of their contents so that the contents may be processed and packed for shipment in the usual manner.

Numerous types of apparatus have previously been employed for accomplishing this unstacking and dumping operation. Most of them are either relatively complex, thereby introducing delicate adjustment and other troublesome maintenance problems, or they are not completely automatic in operation. Use of such prior apparatus has also frequently involved unduly rough handling, with resultant damage not only to the field boxes but also to their contents of fruit or vegetables.

It is a further purpose of this invention, therefore, to provide a simple and reliable apparatus which is capable of performing the desired operations, and which will be much less subject to the disadvantages and limitations previously encountered in this type of apparatus.

Particularly desirable practical embodiments of the present invention are shown in the accompanying drawings, in which Fig. 1 is a view in side elevation of a desirable practical embodiment of the invention, certain parts being shown in section on the line 1—1 of Fig. 2;

Fig. 4 is a fragmentary view, partly in section on line 4—4 of Fig. 1, looking in the direction of the arrows, further illustrating a detail of construction of the apparatus of Fig. 1; and Figs. 5 to 8, inclusive, are schematic diagrams of the electrical operating circuits, each figure representing a different operating condition or phase.

Figure 1:
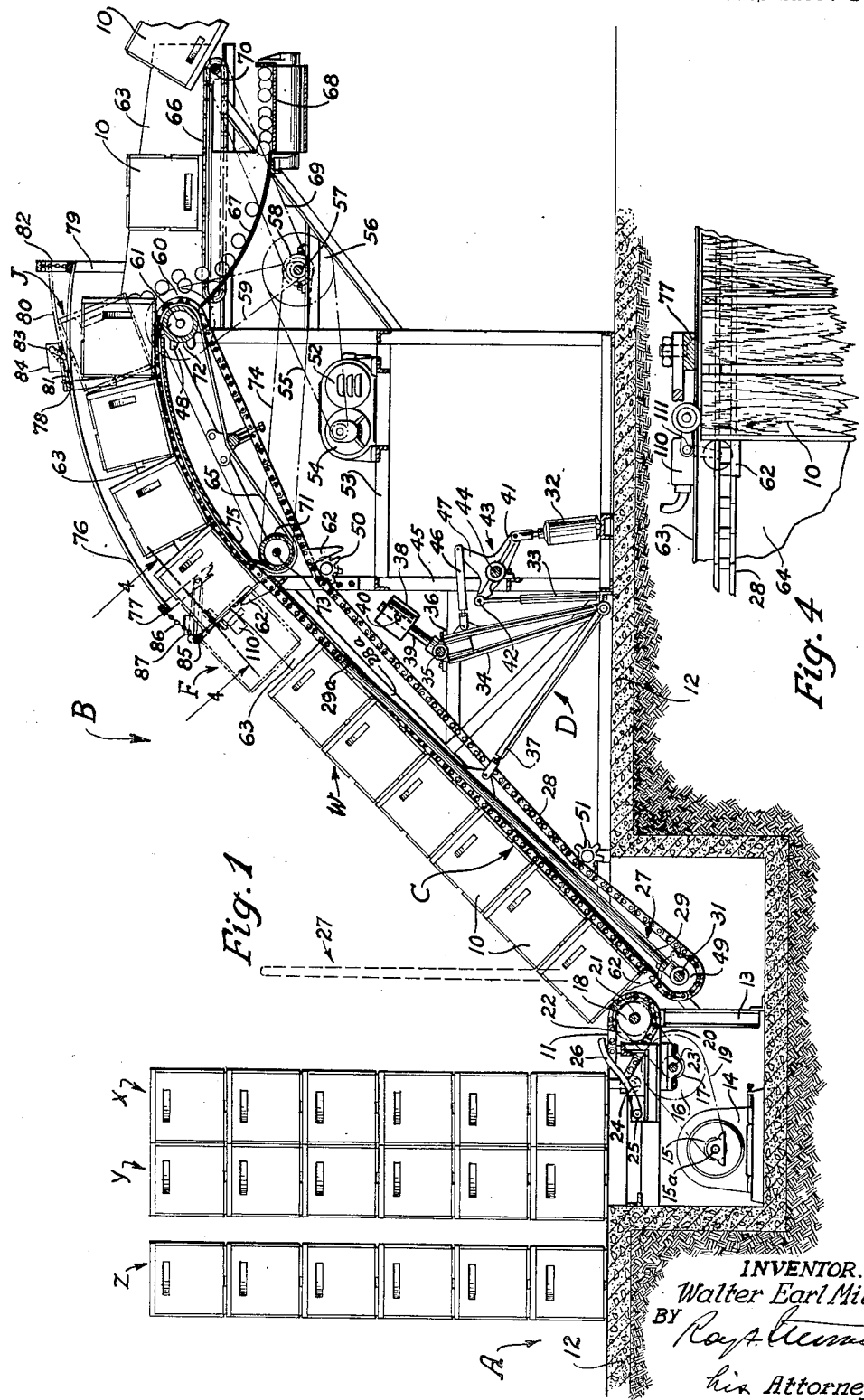
Figure 2:
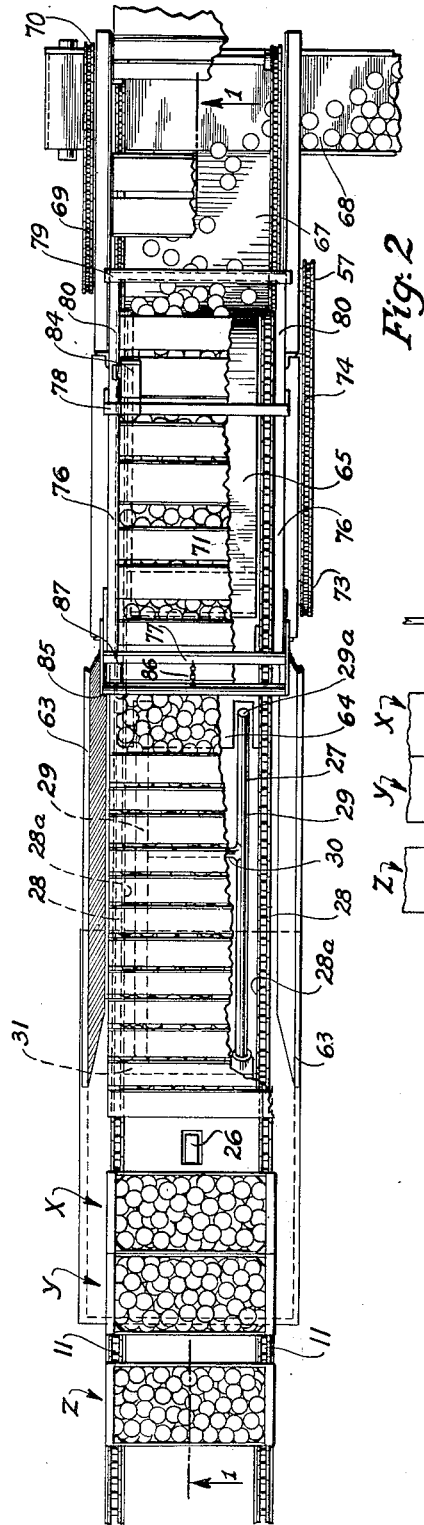
Fig. 2 is a plan view of the apparatus shown in Fig. 1.

Referring to the drawings, A designates generally mechanism for advancing stacks of boxes or crates toward, and feeding them individually to, an apparatus unit, designated generally by B, which is adapted and arranged to receive successive stacks by controlled gravity fall from unit A, and to elevate each stack and dump its component boxes; said unit B comprising elevator means designated generally by C, together with provision, designated generally by D, for controlling the gravity fall of each stack upon said elevator means after it leaves the stack-feeding means. The operation of these cooperating units to perform their several functions in properly timed sequence in acting upon successive stacks of containers for the purposes indicated, is effected by electrical power means actuated and controlled by switches in a system of power circuits, which switches are moved to open and close said circuits by movement of the successive stacks through the apparatus.

Referring to the drawings, W, X, Y and Z are stacks of field boxes 10 containing in this instance, oranges as they are received in the packing house from the grove or field. These stacks are placed on a conveyer which, in this case, is composed of a pair of endless roller chains 11 spaced apart a distance somewhat less than the length of a box. The upper surface of these chains projects slightly above the level of floor 12 to support said stacks while advancing them to the dumping unit described hereinafter. The floor is recessed below the delivery end of the conveyer, and frame 13, located in this recess, supports the projecting portion of the conveyer. Power for advancing the stacks is supplied by means of an electric motor 14 through reducing sprockets 15, 16, 17, and 18, and their respective interconnecting chains 19 and 20 to the conveyer drive shaft 21, and thence to sprockets 22 around which chains 11 pass at the rear of their travel. Sprockets 16 and 17 are mounted on a shaft 23 which is journaled in bearings on frame 13. Sprocket 15 is keyed to the drive shaft 15a of motor 14; while sprockets 18 and 22 are keyed to shaft 21, likewise mounted in bearings on frame 13. Chains 11 pass over idler sprockets 24 under the surface of floor 12 in returning to the receiving end (not shown) of the conveyer.

Immediately in front of sprockets 22 and centrally disposed therebetween, a control switch 25, suitably mounted on a frame member, assists in controlling the feeding of the stacks to the box elevating and dumping unit by the passage of the stacks over a control arm 26 attached to and actuating said switch. Arm 26 is spring-loaded to the upper position as shown in solid lines in Fig. 1. Therefore, when there are no stacks present on the conveyor at this point, arm 26 projects above the upper level of chains 11 and into the path of the advancing stacks. In this position the electrical circuit controlled by the switch is closed, but as a stack passes over arm 26 (e. g. stack X in Fig. 1), the arm is depressed, causing the switch to open its branch of the electrical circuit. Further explanation of the electrical control system will be given in detail hereinafter.

As each successive stack is advanced by the conveyer and fed to unit B, it tilts in passing over sprockets 22 so as to fall forward in the direction of travel. However, instead of falling freely forward and down upon the inclined stack-elevating means C, the stack first strikes pivotally mounted member 27 which, at this phase of operation, is in substantially vertical position as indicated in dotted lines in Figs. 1 and 3. As will presently appear, member 27 is so mounted and supported as to yieldingly resist the weight of the stack which it thus initially receives, and to swing downwardly at a rate slower than that of free fall, in such manner as to deposit the stack upon the chains 28 of the elevating conveyer, which are carried on longitudinal supporting tracks 28*a*. As a result, the stack is deposited on the elevating conveyer with much less shock or jar than has heretofore been unavoidable in apparatus of this general type, and consequently with materially less damage to the field boxes and the fruit contained therein. In this instance, the stack-receiver is a framework composed of a pair of parallel longitudinal tubular members 29 whose length approximates the height of the stack to be handled, joined intermediate their ends by a cross-brace 30. Thus constructed, the stack-receiver can be made amply strong, yet of relatively light weight.

The distance between members 29 is determined primarily by the width of the forward lateral face of a stack (i. e. the length of a box); the spacing apart being sufficient to ensure firm support of a stack of boxes deposited upon stack-receiver 27, but less than the distance between parallel endless chains 28 of the stack elevator and their supporting tracks between which said stack-receiver is arranged to pass in traveling to and from its lowermost inclined position, somewhat below the upper or carrying surfaces of said chains. At its lower end, stack-lowering member 27, which may be conveniently termed the stack "lowerator," is supported by shaft 31 for pivotal movement about a transverse horizontal axis adjacent the lower end of the stack elevator and somewhat below the upper or working run of the conveyer chains 28. By reason of this arrangement, said receiver can be oscillated between the aforesaid substantially vertical position and an inclined position nearly coinciding with the fixed inclined position of elevator mechanism C. Most desirably, the arrangement is such that, as shown in Fig. 1, when a stack of boxes has been lowered into proper position on elevator C, the stack lowerator is wholly below and out of contact with said stack except for engagement of the upper ends 29*a* of the lowerator frame members 29, that is, the portion of the lowerator most remote from its axis of swing, with the under face of the stack. Only when the stack has been subsequently moved upwardly on unit B by operation of the conveyer mechanism C a predetermined distance far enough to cause the last or bottom box of the stack to pass over and beyond said upper ends 29*a*, is the lowerator free to be returned to its vertical receiving position by means now to be described.

In the form of apparatus illustrated in Fig. 1, a combination of a counterweight and hydraulic check-cylinder equipment is employed in controlling the operation of the lowerator, and is so arranged as to permit it to be placed on the floor directly beneath elevator C. As here shown, this equipment includes a pair of hydraulic check-cylinders 32 and 33 to which lowerator 27 is operatively connected by a system of levers and connecting links. The function of these cylinders is to retard the movement of the lowerator between its two limiting positions, cylinder 32 acting, in this case, as a down-check while cylinder 33 acts as an up-check upon such movements. A counterweight 38 is also operatively connected to lowerator 27 by means of the aforesaid system of levers in such manner as to exert thereon a force which opposes its downward movement and is sufficient, when the lowerator is not loaded with a stack, to move it into its upright position. Thus, counterweight 38 serves the dual function of assisting down-check cylinder 32 in yieldingly opposing and retarding the downward movement of lowerator 27, and also of returning the lowerator to its upright position whenever an overlying stack has been completely removed from engagement therewith. The above mentioned leverage system comprises two lever arms 34, each arm being double as here shown and fixed at one end on a horizontal shaft 35, which is supported for rotational movement in bearings 36 on the frame of the apparatus. The other end of each arm 34 is pivotally secured to a link 37, these links being, in turn, pivotally secured at their opposite ends to longitudinal members 29 of lowerator 27. The counterweight is adjustably secured on a lever arm provided by stub-shaft 39 which in turn is fixed to shaft 35. By reason of this arrangement, the aforesaid dual function of counterweight 38 in controlling the movement of the lowerator is accomplished. Provision for adjusting the effective leverage of counterweight 38 is made, in this instance, by sliding counterweight 38 toward or away from shaft 35 on stub 39, and holding it in adjusted position by means of a set screw 40.

Check cylinders 32 and 33 are connected to lever arms 41 and 42, respectively, of a rocker member 43, which is supported for rocking movement by shaft 44 whose ends are carried on frame member 45. Link 46 connects a third arm 47 of the rocker member to one of the levers 34. The connection between lever 34 and rocker member 43 is made close to the fulcrum point of the former so as to secure a reduction in travel and thus permit the use of check cylinders having relatively short strokes. Thus, down-check cylinder 32 functions to retard the downward swing of the stack lowerator 27 and, in effect, to cushion the deposit of the stack carried thereby upon the inclined stack elevator. The up-check cylinder 33 opposes and thereby cushions the action of the counterweight 38 in returning the stack lowerator to vertical position. Cylinder 33 may desirably be smaller than cylinder 32 since its only purpose is to prevent too rapid travel of the lowerator in returning to its vertical position. Both check cylinders may be of any suitable type, of which several employing oil as the hydraulic fluid are well known in the art.

Referring now in greater detail to the construction of elevator C, chains 28, which may desirably be of the roller type, are trained around pairs of oppositely disposed sprockets 48, 49, at the upper and lower ends, respectively, of the elevator. As here shown, the sprockets 49 at the lower end are loose on shaft 31 already referred to. The upper runs of the chains 28 are carried, intermediate said pairs of sprockets, on tracks 28a before-mentioned. On the return side of the conveyer, the chains are supported in this instance by idler sprockets 50 and 51. Said chains are driven by an electric motor 52, supported on frame 53, through a gear reduction 54, together with suitable chain-and-sprocket means which includes chain 55 arranged to drive sprocket 56 on countershaft 57, said countershaft carrying a plurality of sprockets 58 of different diameters fixed thereto, one of which transmits power through chain 59 to sprocket 60 fixed on the stack-elevator driving shaft 61, on which is also fixed the upper pair of conveyer chain sprockets 48. To assist chains 28 in moving a deposited stack upwardly, there are provided three pairs of lifting brackets 62 secured to said chains in such manner as to project outwardly at right angles therefrom, these pairs of brackets being spaced apart equally lengthwise of the chains. To aid in properly positioning the successively deposited box stacks upon chains 28, and also in guiding them and the individual boxes at all times in their travel through unit B, oppositely disposed upright retaining side walls 63 are mounted on the supporting framework of said unit adjacent the conveyer mechanism. Moreover, since fruit will spill out of the top box of each stack as the stack is deposited upon inclined conveyer C, provision is made for holding this spilled fruit on the conveyer. To this end there is provided a stationary apron 64, mounted upon the conveyer frame between chains 28, commencing at a locality less distant from the foot of the elevator than the height of the shortest box stack to be handled. This apron, in cooperation with an auxiliary driven conveyer belt 65 to be further referred to presently, prevents loss of spilled fruit downwardly between conveyer chains 28.

Commencing at a locality somewhat more distant from the foot of the elevator than the height of the tallest stack to be handled, the elevator curves away from the plane of the incline (approximately 45° in the present example) of its lower portion or section, so that the upper run of the conveyer gradually approaches the horizontal in this curved portion or section. Thus, as the stack is advanced by the conveyer, each of its component boxes in succession undergoes a progressive turning movement about its longitudinal axis until, upon arrival at the extreme upper or delivery end of the conveyer, each box is lying flat on its side horizontally, directly above driving shaft 61 of the stack conveyer. Any further advancing movement now causes the box suddenly to topple off the end of the conveyer and completely overturn into full dumping position, so that it falls bottom side up on a pair of parallel horizontal conveyer chains 66 which carry the empty box away, while its content of fruit falls down between said chains into a chute 67 for delivery, in this instance, to a transverse belt conveyer 68, though any conventional type may be employed. The empty box conveyer chains are driven from countershaft 57 through chain-and-sprocket connections 69 and 70, the arrangement being such that the empty box conveyer travels sufficiently faster than conveyer C to carry each empty box laterally out of the way of the next succeeding box of the stack.

Located in the curved upper section of the stack elevator, as shown, the auxiliary conveyer belt 65 before-mentioned is trained about drums 71 and 72. Drum 71 is fixed to shaft 73 which is driven from countershaft 57 through chain connection 74, while drum 72 is loose on shaft 61. The upper run of belt 65 is supported by a curved plate 75 for travel between and in the same direction as conveyer chains 28, in a path parallel to and closely subadjacent that of said chains. The driving ratio is such that the linear speed of belt 65 is somewhat greater than that of the conveyer chains 28 on which the boxes rest. It will be noted that the effective upper run of belt 65 commences close to the upper edge of apron 64. Furthermore, the construction and arrangement of the parts are such that the upper surface of belt 65 constitutes in effect a substantially smooth continuation of the upper surface of said apron. As a result of this arrangement, fruit spilling out of the top box of a stack at the moment of its being deposited upon the conveyer C is pushed upwardly on said apron by the ensuing upward movement of the stack until it strikes the somewhat more rapidly moving axuiliary conveyer belt 65, whereupon the faster moving belt tends to carry the fruit away from the leading or top box of the stack, thereby minimizing the possibility of mechanical injury to such fruit, which is for the most part carried to and discharged from the delivery end of the conveyer unit a little ahead of the arrival of the top box of the stack. While this provision for safeguarding the loose fruit is a desirable feature of the invention in its best embodiments, it is of course not essential to the invention in its broader aspects.

For various reasons it sometimes happens that, where a stack includes a broken or otherwise damaged field box, such box may become lodged or jammed in the conveyor mechanism, more particularly just as it is about to be dumped at the delivery end of the elevator. When this occurs, continued movement of the elevator tends to cause the remainder of the stack to buckle, raising one or more of its intermediate boxes above or out of contact with the elevator chains. This could sometimes result in lifting some of the boxes high enough to be in danger of their falling off the elevator. In order to prevent this, overhead guard means extending above the upper curved portion of the elevator may desirably be provided. In this instance, such guard means comprises two longitudinally extending parallel rails 76 supported on the elevator frame by inverted U-shaped members 77, 78 and 79, at a sufficient distance above the elevator chains to ensure that said rails will be cleared by boxes passing thereunder when resting in normal position on the moving elevator chains. When a jam occurs, these rails 76 prevent any box from rising off the elevator a substantial distance and, not infrequently, this confining action of the guard rails is sufficient to force or break the jam and allow the boxes to pass freely. Sometimes, however, the jamming causes the leading box to be thrust upwardly and become wedged in a position such as that shown in dotted lines at J; or, at the point where the curvature of the elevator commences, a box may be thrust upwardly as indicated, into dotted line position F, and there become wedged. In either case the jamming action which ensues may render it necessary or advisable to stop the apparatus in order to avoid excessive damage to the boxes and their contents, or even possible damage to the apparatus itself. Accordingly, at these critical points, provision is made whereby substantial upward movement of a box away from the elevator chains at either locality J or locality F will cause the apparatus to stop immediately. In the present example, the forward section 80 of each guard rail is hinged at 81 to the main rail 76 for free up-and-down movement relative thereto, the movable section being normally maintained by gravity in the lower position shown in full lines through suspension of its free end from overhead member 79 by chain 82. Sufficient upward swing of rail section 80 by a mispositioned box causes it to move actuating arm 83 of safety or emergency switch 84, and thereby to open the power circuit of supply motors 14 and 52. Similarly, at locality F, a contact member 85, pivotally mounted on member 77 and also connected thereto by chain 86, normally overlies and is cleared by boxes traveling therebeneath, but is deflectable upwardly by a sufficiently mispositioned box to open safety switch 87, which may be, for example, a mercury contact switch mounted thereon, in series with switch 84.

The electrical system referred to generally hereinabove, by which the desired automatically controlled operation of the complete apparatus is effected, is illustrated in detail in Figs. 5–8, which represent diagrammatically consecutive steps in the cycle of operations performed by the dumper. Electric power at the usual commercial voltage is supplied by power mains 100, 101, through main power switch 102, to control-relays 103, 104, which are in circuit with the aforesaid motors 14 and 52, respectively. A second set of power mains 105, 106, supply operating current at substantially lower voltage through a second main switch 107, for actuating the solenoids of the control relays aforesaid. For the purpose of facilitating ready understanding of the diagrams, the circuit through which current is flowing during the particular phase of operation intended to be illustrated is, in each instance, indicated in heavy lines.

In the initial condition where there are no stacks on floor conveyer A or in the dumper itself, actuating arm 26 of switch 25 is always in its upper position to which it is springloaded, and in which position switch 25 is closed. This completes the electrical circuit to the solenoid of relay 103 from power mains 105, 106, through the respective leads and safety switches 84, 87. The normal position of switches 84 and 87 is closed, and only when a jam of the boxes occurs is either of them opened, as has been already explained hereinabove. High potential contact points of relay 103 are thus closed by its operating solenoid, and current flows to motor 14 to drive conveyer A. Switch 25 will remain closed until the passage of a stack on the conveyer over actuating arm 26 depresses it and thereby opens the switch. The primary purpose of this switch is to constantly maintain a stack at a point where it is just ready for delivery by chains 11 to the lowerator 27, so that each time the lowerator has been emptied of a preceding stack, and has returned to its upright position, another stack is waiting to be deposited upon it. Thus, regardless of the spacing apart of the stacks as placed on floor chains 11 by a packing house operator, conveyer unit A operates continuously so long as switch arm 26 is not depressed, whatever may be the position of the lowerator.

In order properly to coordinate the delivery of successive stacks from conveyor unit A to the stack elevating and dumping unit B, with the functioning of unit B consequent upon delivery of a stack thereto, provision is made for accomplishing two principal objectives, viz; (1) prevention of delivery of a succeeding stack from unit A until unit B has completed its operating cycle, and (2) actuation of conveyor C to function in accurately timed relation to the downward and upward swings of lowerator 27 and the position occupied by a stack on conveyer C.

For accomplishing the first of these objectives, there is provided in the present instance a mercury switch 108 mounted upon lowerator 27 in such manner that when the lowerator is in its vertical position, the mercury closes the gap between the contact points of the switch, causing the power circuit of motor 14 to be closed. However, very slight angular movement of the lowerator from its vertical position causes the connection between its contact points to be broken. This switch is arranged in electrical parallel with switch 25, as shown in the wiring diagrams. Therefore, if either switch 25 or switch 108 is closed, conveyor A will continue to run; that is both the switches must be open in order to stop the conveyor. It is accordingly evident that, as stack W passes over and depresses switch arm 26, thus opening switch 25, motor 14 is energized and the conveyor continues to run so long as lowerator 27 is in vertical position. Hence stack W, as well as the succeeding stacks, will continue to be advanced until stack W tips forward, as previously described, against lowerator 27 and swings it downwardly. In the meantime, if stack X is following closely enough, as is here assumed, it has engaged switch arm 26, which therefore remains in its depressed position. If stack X should be spaced a sufficient distance away from stack W on conveyer chains 11, arm 26 would automatically resume its elevated or circuit-closing position when released by stack W, and conveyer A would continue to run until stack X arrived to depress arm 26, regardless of the position of lowerator 27. But an instant after stack W strikes the vertical lowerator 27, thus starting the latter on its swing downward, switch 108 is actuated to open the power circuit and thus immediately to stop conveyor A, unless the succeeding stack X has not yet depressed switch arm 26.

For accomplishing the second objective aforesaid, another mercury switch 109, which controls the power circuit of motor 52 by which elevator C is driven, is mounted on the lowerator in such manner that the circuit through it is open except when the lowerator is only a small angular distance from its lowermost inclined position. In parallel with switch 109, mounted on the frame of elevator C, is switch 110, which independently controls the power circuit of motor 52 and has an actuating arm 111 disposed in the path of boxes moved upwardly on said elevator. Said arm is spring-loaded to maintain the switch open when the arm is not contacted by a box on elevator C, and it is so positioned that switch 110 will be held closed until the last box of a given stack on the elevator has ascended far enough to permit a following stack to be received thereon.

Fig. 6 illustrates the operational phase or stage at which lowerator 27 has just completed its downward swing, and stack W has been deposited upon elevator C. As lowerator 27 is tilted out of its vertical position by the weight of the stack upon it, and starts to swing down, switch 108 opens its circuit. Inasmuch as the parallel circuit controlled by switch 25 has, by assumption, already been opened through depression of switch arm 26 by stack X, motor 14 is de-energized and stops. At this same point, however, switch 109 operates to close the circuit through the solenoid of relay 104, causing it to complete the power circuit through motor 52, thereby starting elevator C. A pair of the brackets 62 on elevator chains 28 thereupon engages stack W at its lower end, and the stack is moved upwardly. When this upward movement has proceeded far enough to carry the bottom box of the stack beyond the upper end of the lowerator, the latter is returned to its upright or stack-receiving position.

In order to coordinate properly the operations of stack elevator C with the operations of lowerator 27 and feeding conveyer unit A, the stack elevator should be so constructed and operated that, at the instant stack X starts to topple over and off the delivery end of conveyer A into contact with the upright lowerator, one of the three pairs of lifting brackets 62 that are equally spaced apart on the elevator chains shall be arriving at a point in its path of travel such that this bracket pair will be in position promptly to engage the bottom of said stack after actual deposit thereof upon the elevator, thereby causing the stack to be moved upwardly in the direction of its inclination. Thus, in the arrangement here illustrated, the stack W has already been elevated, at the instant just assumed (Fig. 7), at least nearly far enough to ensure its being cleared by stack X as the latter is deposited on the elevator. The elevator continues to run because switch arm 111 is still held in circuit-closing position by contact with ascending stack W. In any event, in the brief time interval between incipient toppling of stack X and its arrival upon elevator C, sufficient continued movement of said elevator will have occurred to ensure the necessary clearance between stacks W and X thereon. Also, under the normal operating conditions here assumed, switch 109 will have been actuated to close the parallel circuit through elevator motor 52 before the aforesaid contact of switch arm 111 with stack W ceases, so that the elevator is continuously energized by this overlapping action of the control switches and continues to operate uninterruptedly. As a matter of fact, the design and positioning of switch arm 111 may be such that, so long as stacks are placed close enough together in continuous series on conveyer A to ensure normal steady feeding of stacks to unit B, said switch-arm has no opportunity to swing into its circuit-opening position. Only when the steady feed of stacks is interrupted, need it so function, and in such case it causes the elevator conveyor to stop.

From the foregoing it is evident that, the elevator is driven at such speed that sufficient time is allowed for the receiver to (1) leave its inclined position after depositing a stack, (2) become erect, (3) receive another stack and (4) deposit this upon the elevator before the next pair of lifting brackets 62 arrives in position below the delivery end of conveyer A.

As previously pointed out, switches 84 and 87, protect the machine as well as the fruit, in case a box or boxes should jam in the dumper. As already stated, these switches are in series in the operating circuit of both relays 103 and 104, so that the opening of either switch, as caused by the buckling of a stack as heretofore described, will break the circuit and in turn interrupt the power to motors 14 and 52.

Figure 3:
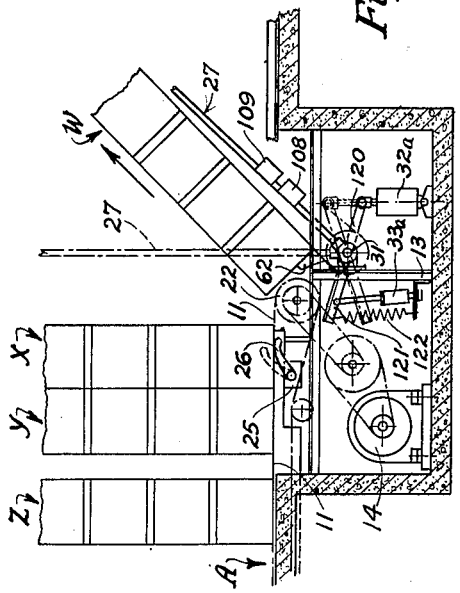
Fig. 3 is a fragmentary view of a somewhat different specific form in which the invention may be embodied.

A modification of the stack lowerator unit D is illustrated in Fig. 3, in which the return movement of the lowerator from its upright position is effected by spring means instead of the gravity weight hereinbefore described. In this case also, the apparatus has been so modified as to permit the placing of the hydraulic check equipment in the pit below the lower end of elevator unit C. As here shown, down-check cylinder 32a is attached to an arm 120 which is fast on shaft 31, while up-check cylinder 33a is secured to an arm 121 similarly fast on shaft 31. By this means, the check cylinders function to yieldingly resist the oscillations of receiver 27 in the same manner as previously described. A tension spring 122 which is secured at one end to a bracket on frame 13 and at its other end to arm 121 serves to return receiver 27 to its upright position after the latter has been freed of all boxes by the action of elevator C.

Although, in the foregoing detailed description, certain typical embodiments of the invention, adapted more especially for handling stacks of boxes or like containers, have been referred to for purposes of illustration in setting forth and explaining the underlying principles involved, it is to be understood that the scope of the invention, in its broader aspects, includes any apparatus for handling stacks of articles generally, whether containers or not, in which there is combined, with a non-vertical conveyer, means operable to retard the fall or gravity descent upon such conveyer of a stack of articles which is being delivered thereto, as by being tilted or toppled over from an upright position, and which is to be further transported while in reclining position.

What is claimed is:

1. In a stack dumper, the combination, with a supporting framework, a stack-conveyer comprising a pair of endless conveyer members mounted thereon in spaced relation for transporting a stack of open containers in reclining position to a dumping point, and means for driving said conveyer members, of a supplemental conveyer adapted to catch and advance contents spilled from a container included in such reclining stack, said supplemental conveyer being mounted to underlie and travel in the same direction as the upper run of the spaced conveyer members but out of contact with such stack, with the upper run thereof extending from an intermediate locality of the super-adjacent stack conveyer to said dumping point; and means for driving said supplemental conveyer to travel faster than said stack conveyer.

2. In a stack dumper, the combination set forth in claim 1, wherein said stack conveyor is inclined upwardly and has its upper portion extending toward said dumping point at a progressively increasing angle to the vertical, with said supplemental conveyor underlying such upper portion.

3. Stack handling apparatus comprising in combination with a feeding conveyor for stacks of containers: an inclined elevating conveyor comprising a pair of spaced chains mounted in a stationary frame, each of said chains including spaced lifting brackets, the lower end of the elevating conveyor being below the level of the stack feeding conveyor; and a yieldable stack lowering assembly pivotally mounted below the level of the stack feeding conveyor and movable from a vertical position proximate to a stack on the end of the feeding conveyor, through the chains of the elevating conveyor, to an inclined position approximating the inclination of the elevating conveyor; and means resisting movement of the assembly to said inclined position; said means for resisting movement of the assembly to inclined position comprising a pivoted bell crank having the end of one arm pivotally linked to the assembly and a counterweight on the other arm, said counterweight being arranged to return the assembly to vertical position.

4. Stack handling apparatus comprising, in combination with a feeding conveyor for stacks of containers: an inclined elevating conveyor comprising a pair of spaced chains mounted in a stationary frame, each of said chains including spaced lifting brackets, the lower end of the elevating conveyor being below the level of the stack feeding conveyor; and a yieldable stack lowering assembly pivotally mounted below the level of the stack feeding conveyor and movable from a vertical position proximate to a stack on the end of the feeding conveyor, through the chains of the elevating conveyor, to an inclined position approximating the inclination of the elevating conveyor; and means resisting movement of the assembly to said inclined position; said means for resisting movement of the assembly to inclined position comprising a pivoted bell crank having the end of one arm pivotally linked to the assembly and a counterweight on the other arm, said counterweight being arranged to return the assembly to vertical position; a second bell crank having the end of one arm pivotally linked to the first mentioned arm of the first bell crank and snubbing means operably connected to the other arm of the second bell crank.

WALTER EARL MILLER.

REFERENCES CITED

The following references are of record in the file of this patent:

UNITED STATES PATENTS

| Number | Name | Date |
| --- | --- | --- |
| 1,358,255 | Seufer et al. | Nov. 9, 1920 |
| 1,444,919 | Hoy | Feb. 13, 1923 |
| 1,613,330 | Prescott | Jan. 4, 1927 |
| 1,676,957 | Leaver et al. | July 10, 1928 |
| 1,907,457 | Stevenson | May 9, 1933 |
| 1,907,458 | Stevenson | May 9, 1933 |
| 2,018,748 | Thompson | Oct. 29, 1935 |
| 2,021,696 | C. H. Miller | Nov. 19, 1935 |
| 2,127,007 | Paxton | Aug. 16, 1938 |
| 2,172,685 | Thompson | Sept. 12, 1939 |
| 2,459,204 | Van Vleck | Jan. 18, 1949 |
| 2,498,740 | W. E. Miller | Feb. 28, 1950 |